No. 648,293. Patented Apr. 24, 1900.
L. PROCHÁZKA.
PROCESS OF MASHING AND BREWING.
(Application filed May 21, 1897.)
(No Model.) 2 Sheets—Sheet 1.

Witnesses.
Victor Herpel
Josef Prohaska

Inventor.
Ladislav Procházka
per Anton v. Herr
Attorney

No. 648,293. Patented Apr. 24, 1900.
L. PROCHÁZKA.
PROCESS OF MASHING AND BREWING.
(Application filed May 21, 1897.)
(No Model.) 2 Sheets—Sheet 2.
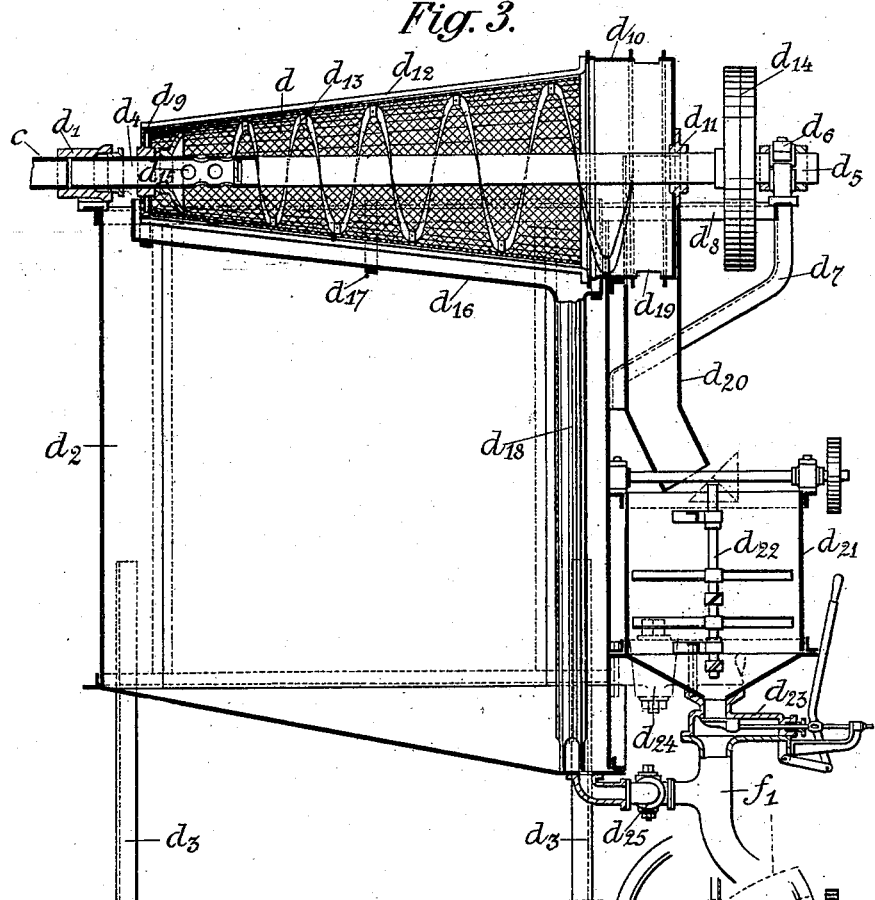
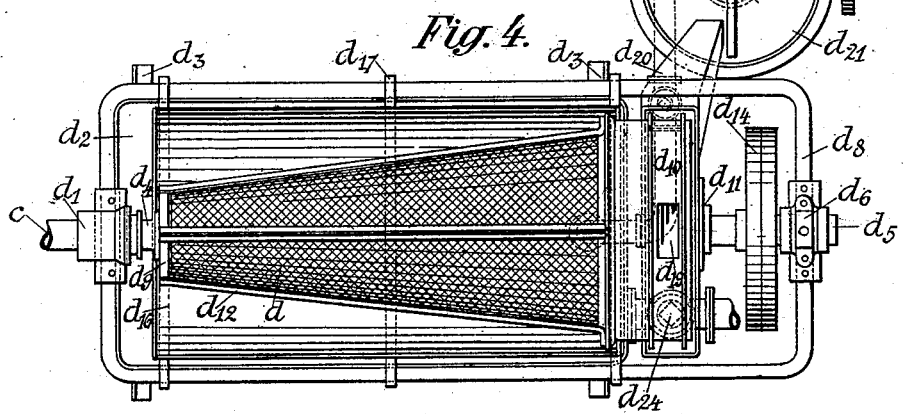
Witnesses.
Victor Kerpl
Josef Prohaska
Inventor.
Ladislav Procházka
per
Anton v. Stow
Attorney

UNITED STATES PATENT OFFICE.

LADISLAV PROCHÁZKA, OF TURNAU, AUSTRIA-HUNGARY.

PROCESS OF MASHING AND BREWING.

SPECIFICATION forming part of Letters Patent No. 648,293, dated April 24, 1900.

Application filed May 21, 1897. Serial No. 637,617. (No specimens.)

*To all whom it may concern:*

Be it known that I, LADISLAV PROCHÁZKA, a subject of the Emperor of Austria-Hungary, residing at Turnau, in the Province of Bohemia, Austria-Hungary, have invented a new and useful Process of Mashing and Brewing, (for which I have received Letters Patent in Austria, No. 47/1,416, dated April 22, 1897,) of which the following is a specification.

This invention relates to mashing and brewing and is designed to effect these operations in such a manner that a greater yield shall be obtained than has heretofore been considered possible, and the resulting beer shall not be liable to become muddy. To this end, after a preliminary mashing operation, I separate the wort or extract from the solid matters and subject the latter to special treatment to thoroughly liberate all the residual starch and convert the albuminous matters into a permanently-soluble form by the action of hot air. After this I bring together the treated matters and the original extract, so that the diastase in the latter may convert the newly-liberated starch, whereupon the whole is heated to kill the diastase, and hot air is again forced through it to finally oxidize any remaining albuminous matters. The wort is thus brought into a very favorable condition for the subsequent operations and is freed from any matters which might set up clouding in the beer produced.

The process above referred to is carried out in a brewing plant substantially of the ordinary kind, but provided with a special rotary strainer and with the necessary pumps and pipe connections for effecting the transference of the contents from one vessel to another.

Figure 1:
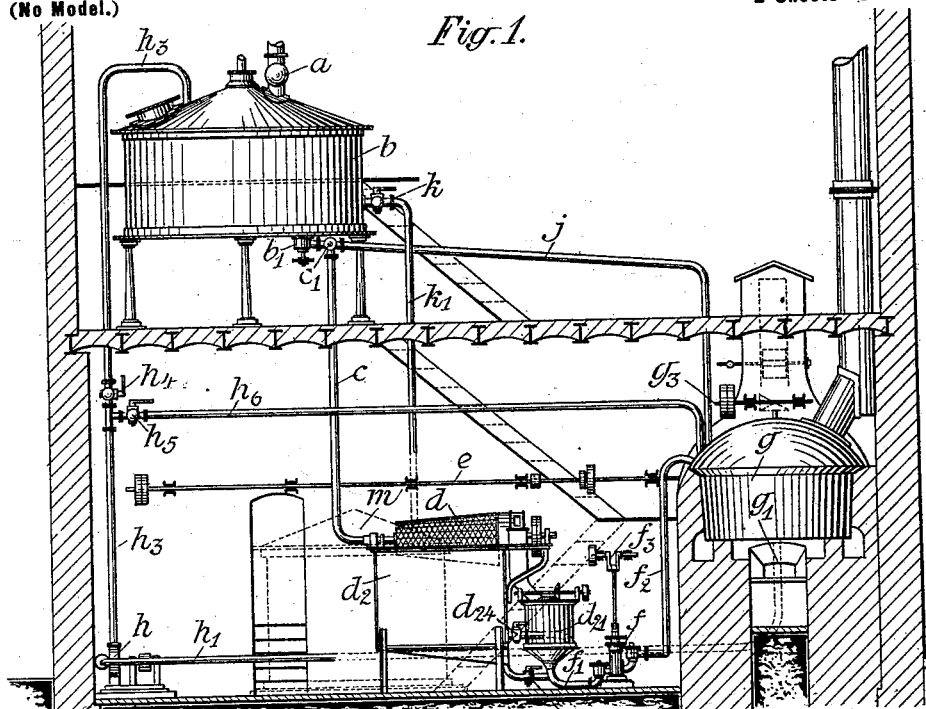
Figure 2:
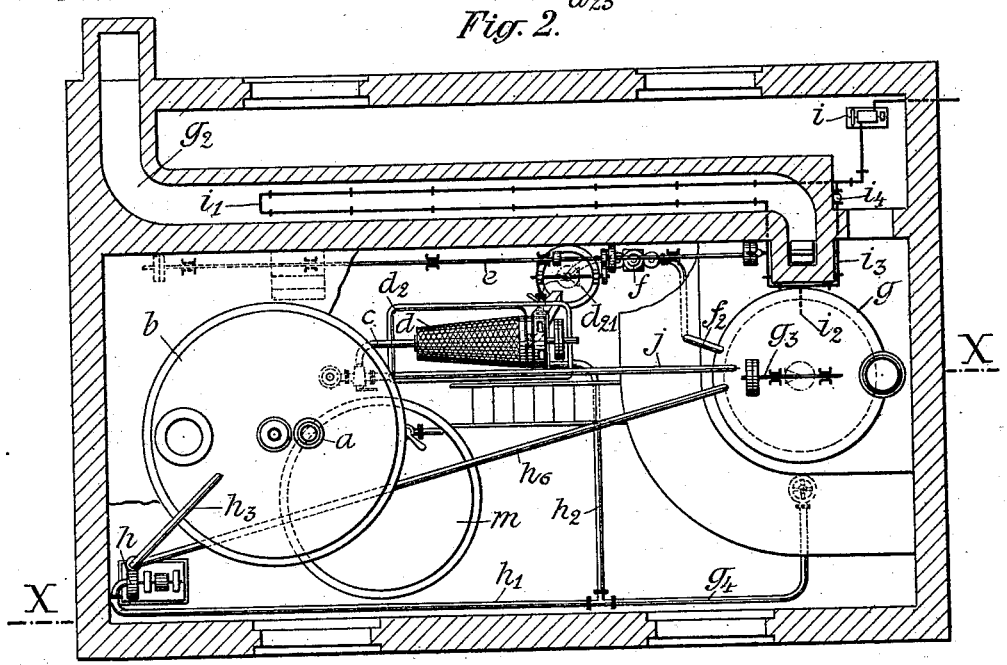

Referring to the drawings, Figure 1 is a section of a brewing plant on the line X X, Fig. 2, showing the apparatus itself in elevation. Fig. 2 is a sectional plan of Fig. 1. Fig. 3 is a vertical central section, partly in elevation, of the rotary strainer above referred to. Fig. 4 is a plan of the said strainer.

The malt and water are supplied through a pipe $a$ to the mash-tun $b$ in the proportion, say, of one hundred kilograms of malt to four or 4.5 hectoliters of water, and the mashing is carried on for about an hour at a temperature of from 50° to 70° centigrade. The whole contents of the tun $b$ are then strained, for which purpose they are run (through a valve $b'$, three-way cock $c'$, and pipe $c$) into the rotary strainer $d$, which effects the complete separation of the extract from the husks, unaltered starch, and other residues. The construction of the strainer will be described presently. Suffice it to say that all solid residues are discharged therefrom into a vat $d^{21}$ and after being diluted with water are raised by a pump $f$ into the boiling-pan $g$. The strained extract is allowed to stand and settle and is then returned to the mash-tun from the strainer by a pump $h$, said extract containing nearly the whole of the diastase. The settlings or sediment are mixed with the above-mentioned diluted residues before they enter the boiling-pan. In the latter the residues are heated to about 60° centigrade, and then hot air at 125° centigrade is blown into them by a blowing-engine $i$. By the action of the hot air the albuminoids present are oxidized into amids and peptones and are rendered permanently soluble. When the blowing is finished, the whole contents are boiled for twenty or twenty-five minutes to liberate any starch that may have escaped conversion in the preliminary mashing. After this treatment the residues are allowed to flow from the boiling-pan to the pump $h$, which discharges them into the mash-tun, where they again mix with the extract. By the action of the diastase in the latter the whole of the newly-liberated starch, which is now in a soluble form, becomes saccharified. The diastase is then destroyed, so as to prevent its setting up any further action in the wort, and to this end the contents of the tun $b$ are again run into the pan $g$ and thoroughly boiled, after which they are returned to the mash-tun by the pump $h$. The wort is then strained through the husks in the usual way and is conducted to the hop-filter $m$, where it is boiled with the hops, hot air being again injected into it to complete the oxidation of the albuminous matters.

I will now describe in detail certain parts of the apparatus which for the sake of clearness are merely referred to incidentally in the foregoing description of the process.

The rotary strainer $d$, which is shown more clearly in Figs. 3 and 4, is, as stated, connected through a pipe $c$ with the mash-tun. The lower end of this pipe $c$ is tightly inserted into an annular bearing $d'$, secured to the flanged edge of a sheet-metal casing or tank $d^2$, which is supported by angle-iron legs $d^3$ and is strengthened by angle-irons, as shown in dotted lines, Fig. 3. The inner end of the said bearing $d'$ forms a stuffing-box, through which passes a tubular part $d^4$ of a shaft $d^5$, on which the conical wire drum forming the strainer $d$ is mounted. The opposite end of the shaft $d^5$ rests in an ordinary bearing $d^6$, supported by brackets $d^7$, riveted to the side of the casing, and by the wide flange $d^8$ on the said casing. The narrow end of the drum $d$ is closed by a disk or nave $d^9$, secured to the shaft $d^5$, while its wider end is connected with a sheet-metal cylinder $d^{10}$, fastened to the shaft by means of its nave $d^{11}$. Stiffening-ribs $d^{12}$ extend along the sides of the drum and have secured to them by means of wires the metal strip or helix $d^{13}$. By means of the belt-pulley $d^{14}$, driven from the main shaft $e$, a slow rotary movement of about twenty revolutions per minute is imparted to the drum. The materials from the mash-tun enter the strainer through the holes $d^{15}$ of the tubular shaft $d^4$, and the solution of maltose and dextrine filters through the drum $d$ into an inclined gutter $d^{16}$, carried by braces $d^{17}$. A pipe $d^{18}$ then conducts the extract into the tank $d^2$, upon the inclined bottom of which any starch granules or floating matters settle down as sediment. The solid matters retained by the drum $d$ are pushed forward by the helical rib $d^{13}$ into the cylinder $d^{10}$. Thence they drop through slots $d^{19}$, formed in the sides of the said cylinder $d^{10}$, into a hopper $d^{20}$ and are discharged into the vat $d^{21}$, as before stated. In this vat, which is provided with an agitator $d^{22}$, suitably geared with the driving-shaft $e$, the solid portion of the mash is diluted with water as it arrives and is immediately transferred by means of the pump $f$ into the boiling-pan $g$, heated by the furnace $g'$. The pump $f$ has its suction-pipe $f'$ connected to the valve-case of a slide-valve $d^{23}$, by which the vat $d^{21}$ is under ordinary circumstances closed at its conical bottom, while the delivery-pipe $f^2$ of the said pump opens into the boiling-pan $g$. The pump is operated by a crank $f^3$ driven from the main shaft $e$. The pump $h$ is also driven by the shaft $e$ and is connected through the cock $d^{24}$ and the pipes $h^2$ and $h'$ with the strainer-casing $d^2$. Its delivery-pipe $h^3$ extends upward and opens into the mash-tun $b$. When this pump is put into action to pump the extract into the tun, the cock $h^4$ of the pipe $h^3$ is opened and the cock $h^5$ of the branch pipe $h^6$, leading to the boiling-pan $g$, is closed. When, however, the pump is used to force the contents of the boiling-pan into the mash-tun, these cocks are operated accordingly. The sediment collecting on the inclined bottom of the tank $d^2$ is discharged through the lower cock $d^{25}$ into the suction-pipe $f'$ of the pump $f$, by which it is forced into the boiling-pan $g$.

The injection of heated air is effected by the following arrangement: The blowing-engine $i$ delivers air into a series of ribbed heaters or gilled pipes $i'$, located within the flue $g^2$, and the air thus heated flows out through the fine perforations of a pipe $i^2$ extending into the pan $g$. Through the pipe $i^3$, branched off directly from the blower $i$ and also opening into the perforated pipe $i^2$, so much cold air is admitted as is required to obtain the temperature of 125° centigrade, the cock $i^4$ controlling the flow of cold air. An agitator driven by the shaft $g^3$ keeps the contents of the boiling-pan continually moving, so that all particles of the same are successively subjected to the action of the hot air. The hop-filter $m$ receives the wort through a cock $k$ and pipe $k'$. The last injection of air is effected in this filter by a finely-perforated pipe (like the pipe $i^2$) in communication with the pipes $i'$ and $i^3$. This perforated pipe and its connections are not shown in the drawings in order not to unduly complicate them.

Having now described my invention, I claim and desire to secure by Letters Patent—

1. In the mashing and brewing of beer, the process which consists in mashing the malt, straining and separating the residual matters from the mash liquor or extract, treating said residue with hot air, boiling the same, remixing it with the extract, allowing the diastase to act on the newly-liberated starch, boiling the mixture to kill the diastase, hopping the wort, and again treating it with hot air to oxidize the residual albuminous matters, substantially as set forth.

2. In the mashing and brewing of beer, the process which consists in preliminarily mashing the malt, straining the bulk of the residue from the extract, allowing said extract to stand to deposit suspended particles, mixing said deposit with the strained residue, heating said mixture and blowing air heated to 125° centigrade through it, mixing it with said extract and allowing the diastase in the latter to act on the newly-liberated starch, boiling the whole to kill the diastase and blowing air at 125° centigrade through it, substantially as described.

3. In the production of beer, the process for thoroughly saccharifying the whole of the starch, which consists in mashing the malt, straining the extract, diluting the thick residue from the straining, allowing the strained extract to stand to deposit sediment, drawing off the clear supernatant extract, mixing the sediment with the thick residue, boiling the mixture to liberate any starch remaining therein, then returning the boiled mixture to the clear extract, and allowing the diastase in the latter to convert the newly-liberated starch, substantially as described.

4. The process herein described of making beer, which consists in straining the mash to separate the liquid from the solid, allowing the liquid to stand until a sediment is deposited, drawing off the thin liquid from above the sediment, adding the sediment to the thick mass and cooking the same to convert the starch thereof into paste, adding the mass thus cooked to the liquid, and finally boiling the wort, substantially as and for the purpose set forth.

In witness whereof I have signed this specification in presence of two witnesses.

LADISLAV PROCHÁZKA.

Witnesses:
VIASOR VRENFEL,
JOSEF PROHASKA.